United States Patent
Spirk et al.

(10) Patent No.: US 8,269,442 B2
(45) Date of Patent: Sep. 18, 2012

(54) METHOD AND APPARATUS FOR DRIVING A BRUSHLESS D.C. MOTOR

(75) Inventors: Hans Spirk, Lahr (DE); Gualtiero Bagnuoli, Turin (IT)

(73) Assignee: Micronas GmbH, Freiburg (DE)

( * ) Notice: Subject to any disclaimer, the term of this patent is extended or adjusted under 35 U.S.C. 154(b) by 433 days.

(21) Appl. No.: 12/706,536

(22) Filed: Feb. 16, 2010

(65) Prior Publication Data
US 2010/0207562 A1    Aug. 19, 2010

(30) Foreign Application Priority Data
Feb. 16, 2009 (DE) .................. 10 2009 009 059

(51) Int. Cl.
*H02P 6/00* (2006.01)
*H02P 1/04* (2006.01)
*H02P 6/18* (2006.01)
*H02P 27/04* (2006.01)
*H02P 27/00* (2006.01)
*H03K 5/00* (2006.01)

(52) U.S. Cl. ........... 318/400.2; 318/400.32; 318/400.33; 318/400.34; 318/400.35; 318/400.36; 318/800; 318/801; 318/811

(58) Field of Classification Search ............... 318/400.2, 318/400.32, 400.33, 400.34, 400.35, 400.36, 318/800, 801, 811
See application file for complete search history.

(56) References Cited

U.S. PATENT DOCUMENTS

| | | | |
|---|---|---|---|
| 4,933,616 A * | 6/1990 | Chang et al. | 318/561 |
| 7,400,103 B2 * | 7/2008 | Hofer | 318/276 |
| 7,589,487 B2 * | 9/2009 | Moller et al. | 318/603 |
| 7,834,573 B2 * | 11/2010 | Lindsey et al. | 318/490 |
| 2005/0184690 A1 * | 8/2005 | Petersen | 318/254 |
| 2006/0170383 A1 | 8/2006 | Narumi et al. | |
| 2007/0013330 A1 | 1/2007 | Noh | |
| 2007/0029956 A1 * | 2/2007 | Hofer | 318/276 |

FOREIGN PATENT DOCUMENTS

| | | |
|---|---|---|
| DE | 69017152 | 7/1995 |
| DE | 10 2004 036 861 | 9/2005 |
| DE | 69831776 | 8/2006 |

OTHER PUBLICATIONS

Micronas Product Information, HVC 22xyA, Oct. 2008.

* cited by examiner

*Primary Examiner* — Walter Benson
*Assistant Examiner* — Gabriel Agared
(74) *Attorney, Agent, or Firm* — Muncy, Geissler, Olds & Lowe, PLLC

(57) ABSTRACT

A brushless D.C. motor includes having a rotor and a plurality of stator windings that define a stator field when driven by a bridge circuit, where a microprocessor drives the bridge circuit using a pulse-width modulation logic. The brushless D.C. motor is driven by triggering a commutation of the stator field; voltage induced by rotating the rotor in a non-energized stator winding is monitored to determine whether the voltage reaches, exceeds or is below a threshold voltage. A delay time between triggering the commutation of the stator field and the voltage reaching, exceeding or being below the threshold voltage is determined; and using the determined delay time a triggering time point for a next commutation of the stator field.

6 Claims, 4 Drawing Sheets

METHOD AND APPARATUS FOR DRIVING A BRUSHLESS D.C. MOTOR

PRIORITY INFORMATION

This patent application claims priority from German Patent Application No. 10 2009 009 059.2 filed Feb. 16, 2009, which is hereby incorporated by reference in its entirety.

BACKGROUND OF THE INVENTION

The invention relates to brushless D.C. motor control, and in particular to driving a brushless D.C. motor.

A typical brushless D.C. motor includes a plurality of permanent magnets attached to a rotor, one or more pole pairs and a stator having a plurality of phases. The motor can be actuated by generating a rotating magnetic field that varies, with respect to time, current flow into the stator windings, particularly, e.g., a block commutation of the phases, with the help of control electronics. The rotor follows the rotating magnetic field, thereby rotating the rotor.

Timing the rotating magnetic field, and in particular directing the current flow through the stator as a function of rotor position, is crucial for proper operation of the motor. For example, where the stator field is ahead of the rotor, the rotor may no longer be able to follow the field and, therefore, be blocked. Where the rotor is ahead of the stator field, it may be braked and, therefore, the motor may no longer be able to develop its full torque.

A sensor, such as a Hall sensor, can be used to provide information on the actual position of the rotor to facilitate proper timing. However, disadvantageously, such an additional sensor adds to the costs associated with the motor.

Alternatively, voltage that is back-induced (i.e., a back-electro-motive force, BEMF) from the rotating rotor into the stator winding can be observed, particularly on a non-energized stator winding, to provide information on the actual position of the rotor. This positional information may be obtained by detecting the zero passages of the BEMF. Examples of such methods are disclosed in U.S. Publication Nos. US 2007/0013330 and U.S. 2006/0170383, and in German Publication Nos. DE 69831776 and DE 69017152.

The BEMF may be evaluated in a computer-supported manner using a rapid A/D converter. Results from the A/D converter are compared, using software, to a reference value corresponding to the zero passage of the BEMF. Disadvantageously, however, this method requires providing the rapid A/D converter, a powerful CPU to run the zero passage detection software, and also an additional reference voltage source, an external reference input at a neutral point of the motor or a virtual neutral point to provide the reference value. In addition, where the motor is regulated via pulse-width modulation (PWM), the A/D converter and the motor voltage must be synchronized, or a filtering circuit that prolongs signal propagation times must be provided.

Alternatively, an additional circuit may be configured with the control circuit that (i) compares the BEMF to a reference voltage corresponding to the zero passage, and (ii) supplies a trigger signal to a microcontroller when the reference voltage is either exceeded or is not reached. Disadvantageously, however, this additional circuit increases both manufacturing costs and circuit complexity.

There is a need for an improved technique for driving a brushless D.C. motor after starting up.

SUMMARY OF THE INVENTION

According to one aspect of the present invention, a method is provided for driving a brushless D.C. motor having a rotor and a plurality of stator windings that define a stator field when driven by a bridge circuit, where a microprocessor drives the bridge circuit using pulse-width modulation logic. The method includes triggering a commutation of the stator field; monitoring voltage induced by rotating the rotor in a non-energized stator winding to determine whether the voltage reaches, exceeds or is below a threshold voltage; determining a delay time between triggering the commutation of the stator field and the voltage reaching, does not reach, or exceeding the threshold voltage; and using the determined delay time to establish a triggering time point for a next commutation of the stator field. A multi-threshold comparator logic is used for the monitoring of the induced voltage. The multi-threshold comparator logic is integrated in the microprocessor, and is synchronized with the pulse-width modulation logic. The synchronization is produced via a fast shutdown logic integrated with the microprocessor.

Monitoring the voltage induced by rotation of the rotor in a non-energized stator winding relative to whether it reaches, does not reach, or exceeds a threshold voltage, may be carried out with a multi-threshold comparator logic integrated in the microprocessor and synchronized with the pulse-width modulation. The synchronization is produced by the fast shutdown logic integrated in the microprocessor.

The microprocessor for driving the brushless D.C. motor includes a CPU, pulse-width modulation logic that includes two pulse-width modulation modules for each phase of the D.C. motor, fast shutdown logic that includes a fast shutdown logic module for each phase of the D.C. motor, and a multi-threshold comparator logic that includes a multi-threshold comparator logic module ("MTC") for each phase of the D.C. motor. Output signals provided by the pulse-width modulation logic can be queried within the microprocessor and used as a control signal for the fast shutdown logic.

A reference potential is selected for the multi-threshold comparators (MTCs) that corresponds to one-half of an operating potential VBAT with reference to ground GND. One of the multi-threshold comparators is connected to a stator winding terminal each time via a current-limiting resistance RFBK. In a D.C. motor embodiment that includes three stators, depending on which of the steps the stator field is found in, the MTC module, which is connected to the non-energized stator winding terminal, is programmed to detect a positive (VBAT after GND) or negative (GND after VBAT) zero passage of the BEFM. This programming can occur after a commutation.

When a block commutation is used, pulse-width modulation (PWM) usually changes the voltage at the stator winding terminals. Thus, while the BEMF voltage is monitored, the zero passage of the BEMF lies, for example, only at VBAT/2 for the voltage modulated during the time that the PWM is turned on. When the PWM is off and the reference VBAT/2 is used, however, an evaluation of the BEMF voltage can lead to a false readings.

The fast shutdown logic permits the output signal of the MTCs to be evaluated, for example, only when the PWM modulated voltage is turned on. In addition, the fast shutdown logic may further limit the observation window via a programmable delay time. Thus, the time between the PWM signal, which is provided within the microprocessor and used by the fast shutdown logic for synchronization, and the signal observed via the multi-threshold comparators at the non-energized stator winding terminal can be compensated.

When a zero passage of the BEMF is detected, an interrupt is triggered by the fast shutdown logic. The time which has elapsed since the previous commutation is set as the delay time between the zero passage of the BEMF and the next commutation time point by programming for example a hardware timer within the associated fast shutdown logic. Alternatively, the time which has elapsed since the previous commutation, minus a phase advance which is dependent on the RPM of the rotor, is set as the delay time between the zero passage of the BEMF and the next commutation time point by programming a hardware timer within the fast shutdown logic. Following this elapsed time, the timer triggers an interrupt. The timer is started up within the associated timer ISR, the next commutation step is carried out, and the MTC belonging to the new commutation step is configured to detect the zero passage of the BEMF.

In some embodiments, by using the multi-threshold comparators and the fast shutdown logic present in the microprocessor, other components may not be needed for detecting the zero passage of the BEMF. In contrast to a solution using an A/D converter, the CPU load may be substantially reduced. Also, an RPM adjustment range of 1:5 or greater is possible using this described method.

These and other objects, features and advantages of the present invention will become more apparent in light of the following detailed description of preferred embodiments thereof, as illustrated in the accompanying drawings.

DETAILED DESCRIPTION OF THE INVENTION

Figure 1A:
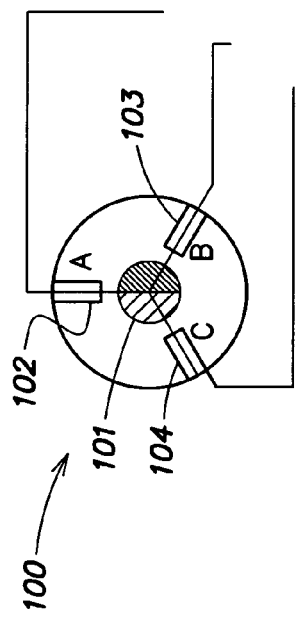
FIG. 1A schematically illustrates a three-phase brushless D.C. motor having a rotor and a plurality of stator coils.

FIG. 1A schematically illustrates a three-phase brushless D.C. motor 100 having block communication. It should be noted, however, that the present invention can be applied to any brushless multiphase motor, and in particular to those motors that are connected to a Y configuration. Referring again to FIG. 1A, the motor 100 includes three stator coils (hereinafter "phases") 102, 103, 104, and a rotor 101 having a permanent magnet.

Figure 1B:
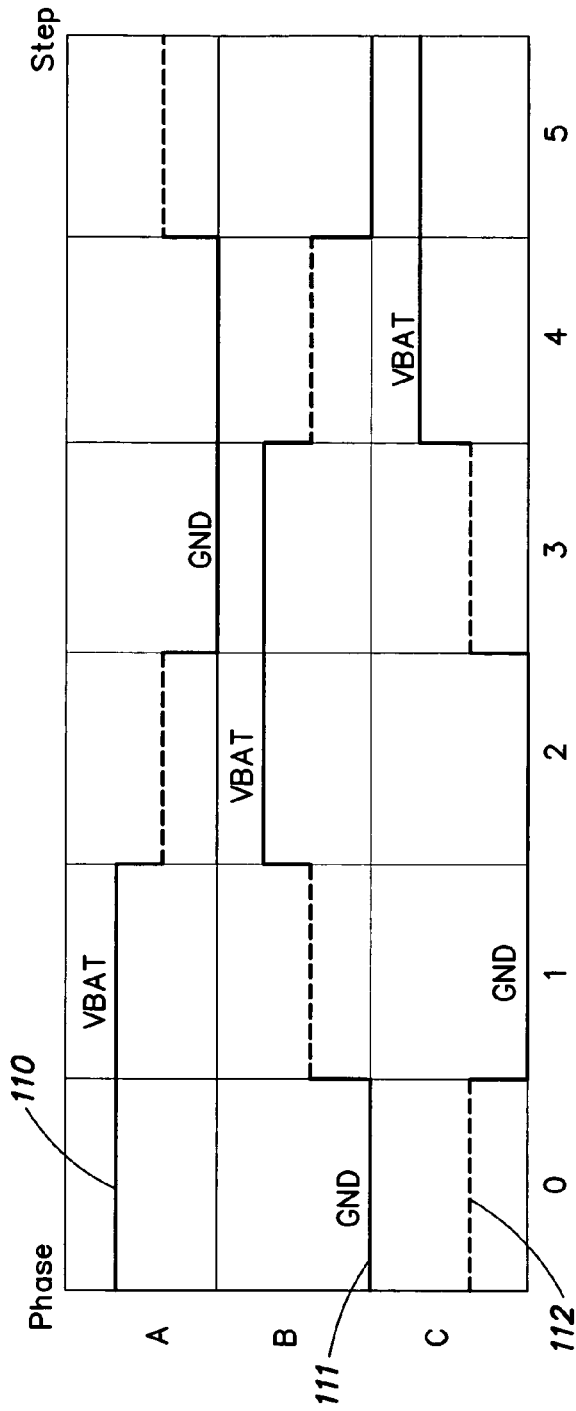
FIG. 1B graphically illustrates potential course versus ground GND for phase contact points during a rotor rotation driven by block commutation.

FIGS. 1B to 1E graphically illustrate a technique for driving the motor 100. FIG. 1B graphically illustrates a potential course versus ground GND for contact points of the phases, 102, 103, 104 respectively, during a rotor rotation using block commutation. Curve 110 illustrates the potential course for the phase 102, curve 111 illustrates the potential course for the phase 103, and curve 112 illustrates the potential course for the phase 104.

Rotation of the rotor 101 may be subdivided into 6 steps, which are consecutively numbered from 0 to 5 in FIG. 1B. Each passage from one step to the next uses commutation. In each step, an operating potential VBAT is applied opposite the ground GND at a first one of the contact points for the phases 102, 103, 104, a second one of the contact points for the phases 102, 103, 104 is held at ground, and a third one of the contact points for the phases 102, 103, 104 floats free (i.e., the third contact point is not held at a defined potential specified in advance as is the case for the first and the second contact points). The float in each of the curves 110, 111 and 112 is shown by a dashed line. The BEMF is disregarded in FIG. 1A; thus, a potential of VBAT/2 versus GND is provided for the floating phase for a Y connection where it is assumed that the stator coils are identically dimensioned, which is usually a good approximation.

In order to simplify the language used, in the following, the phrase "a phase is set to a potential" is used, which means that the contact point of the corresponding stator coil or phase is set to this potential. If the potential VBAT is applied, this corresponds to a "HI" state; the application of the ground potential GND corresponds to a "LOW" state.

FIG. 1B illustrates the various steps as follows:

during the 0 step, the phase A 102 is held at VBAT, the phase B 103 is held at GND, and the phase C 104 floats;

during step 1, the phase A 102 is held at VBAT, the phase C 104 is held at GND, and the phase B 103 floats;

during step 2, the phase B 103 is held at VBAT, the phase C 104 is held at GND, and the phase A 102 floats;

during step 3, the phase B 103 is held at VBAT, the phase A 102 is held at GND, and the phase C 104 floats;

during step 4, the phase C 104 is held at VBAT, the phase A 102 is held at GND, and the phase B 103 floats; and during step 5, the phase C 104 is held at VBAT, the phase B 103 is held at GND, and the phase A 102 floats.

Figure 1D:
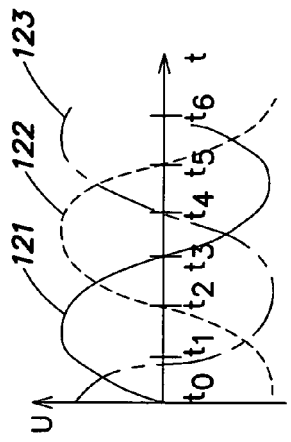
FIG. 1D graphically illustrates the BEMF that is induced each time in the stator coils during the operation of the motor as a generator.
Figure 1C:
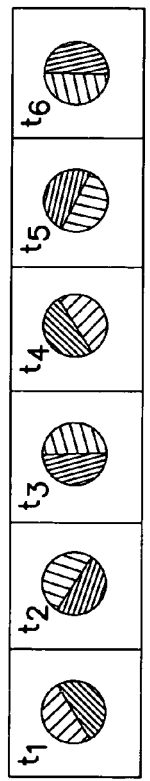
FIG. 1C schematically illustrates a position of the rotor of the brushless D.C. motor in FIG. 1A for six different time points.

FIG. 1C schematically illustrates the position of the rotor 101 at six different time points t1, t2, t3, t4, t5 and t6.

In FIG. 1D, the BEMF, which is induced each time the motor 100 operates as a generator, is shown as a function of time. In particular, the BEMF is shown as a function of time in the stator coils or the phases 102-104 relative to the time points t1, t2, t3, t4, t5, t6 as defined by the rotor positions shown in FIG. 1C. Therefore, in FIG. 1D, the BEMF of the phase A 102 is illustrated as a solid line 121, the BEMF of the phase B 103 is illustrated as a dashed line 122, and the BEMF of the phase C 104 is illustrated as a dot-dash line 123.

Detection of the zero passage of the BEMF, which is used to determine rotor position, occurs in each stator winding in the floating phase.

Figure 1E:
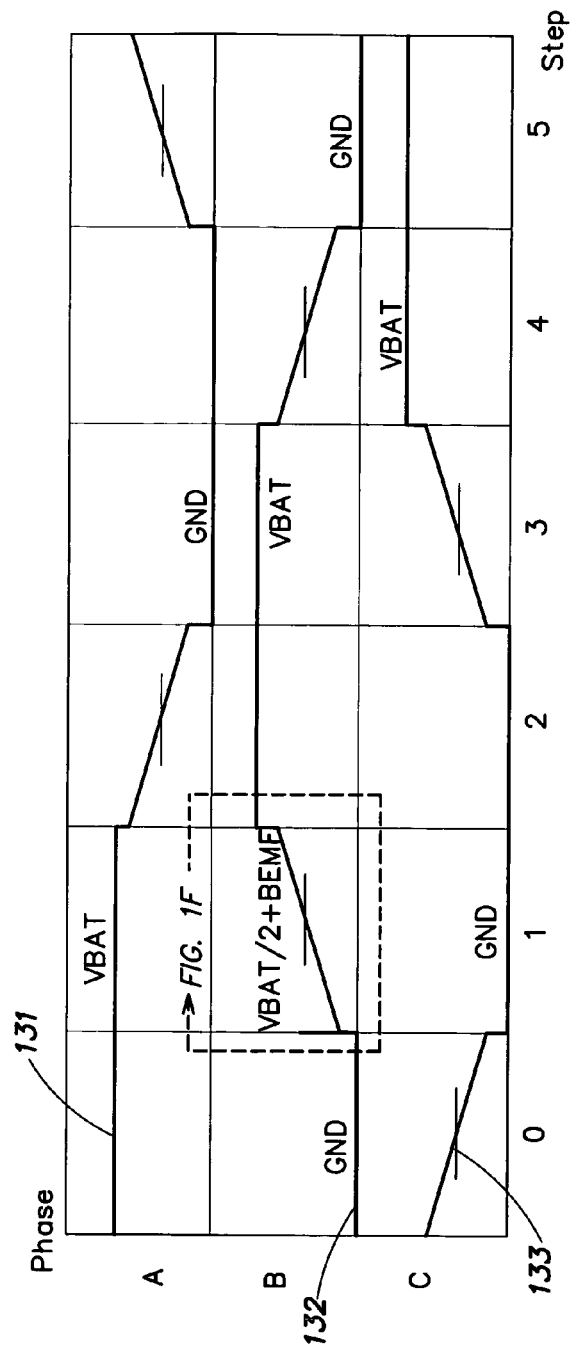
FIG. 1E graphically illustrates a curve for the control voltage as a function of the respective step of the block commutation from FIG. 1B where the BEMF is considered.

FIG. 1E graphically illustrates a curve for the control voltage as a function of the respective step of the block commutation from FIG. 1B. That is, this curve accounts for the BEMF in the curve 131 for the phase A 102, the BEMF in the curve 132 for the phase B 103, and the BEMF in the curve 133 for the phase C 104. At a time point where the BEMF has its zero passage, a potential of VBAT/2 opposite the ground can occur. This limit can occur after the step starting from higher potential values and starting from lower potential values. Correspondingly, the condition to be monitored each time can show, depending on the phase A 102, B 103, C 104, respectively in a given step, whether the voltage has reached, has exceeded, or is below the threshold value.

Figure 1F:
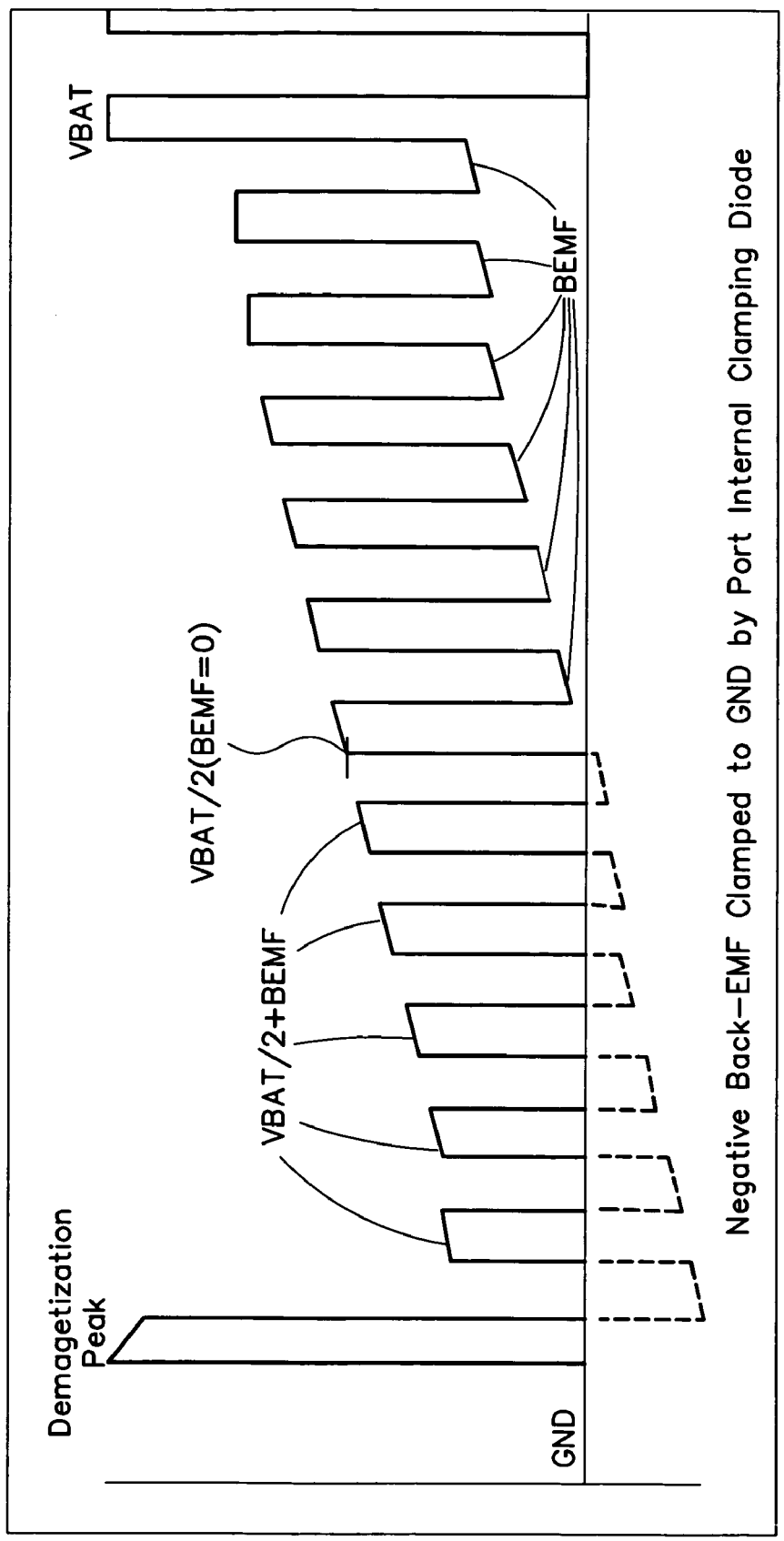
FIG. 1F graphically illustrates a potential course versus ground GND of a floating phase, where effects of the pulse-width modulation are considered.

FIG. 1F graphically illustrates a potential course versus ground GND of a floating phase, where effects of the pulse-width modulation are considered, for example, for the phase B 103 in step 1. Due to the pulse-width modulation, the floating phase, for example, only has a potential of BEMF opposite GND relative to those time points at which the pulse-modulated signal is in the "LOW" state. Therefore, in order to avoid the risk of erroneous measurements, the synchronization of time points at which the BEMF is analyzed is used with the pulse-width modulation.

Figure 2:
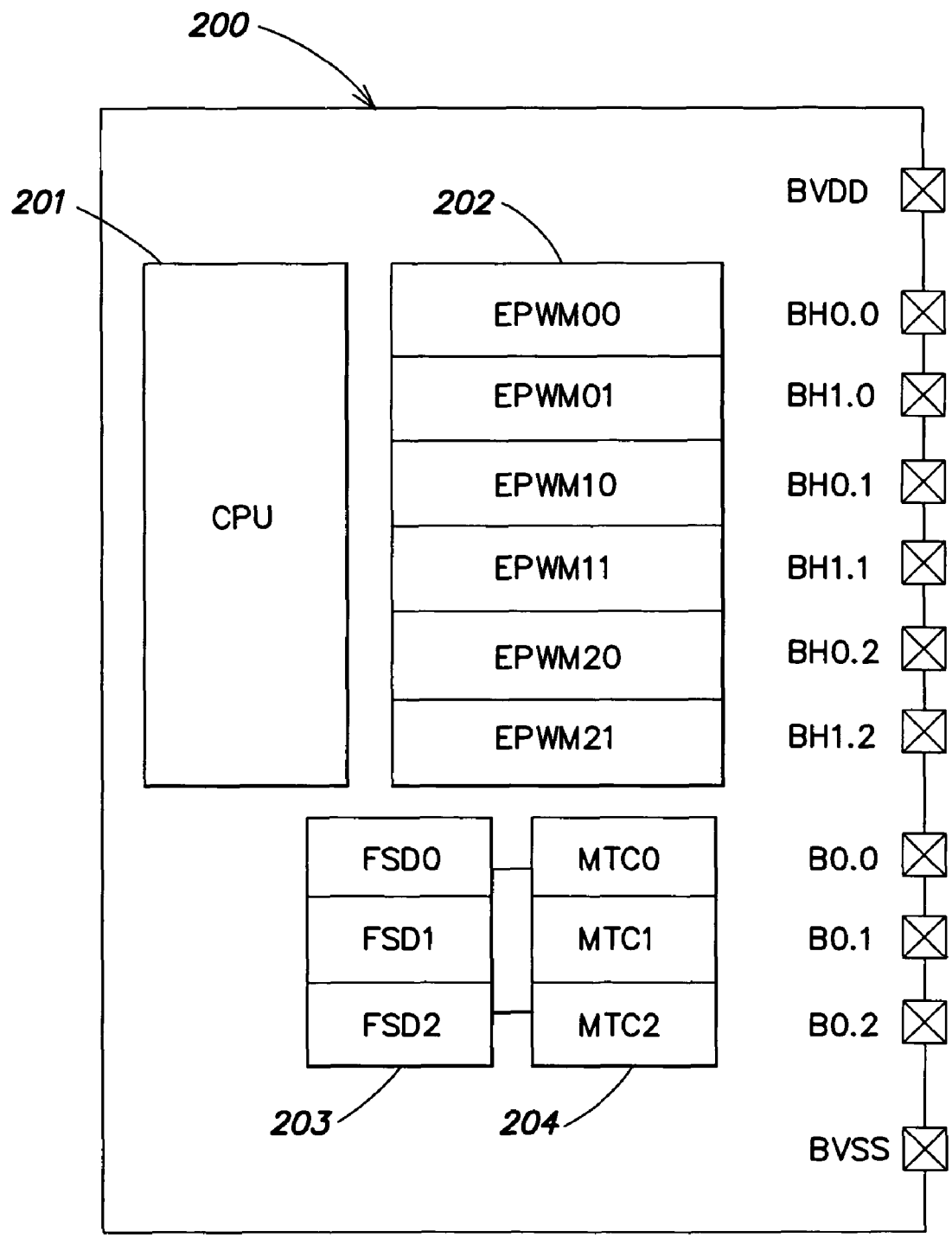
FIG. 2 schematically illustrates one embodiment of a microprocessor for driving a three-pole brushless D.C. motor.

FIG. 2 schematically illustrates one embodiment of a microcontroller/microprocessor 200 for driving a brushless multiphase motor such as, but not limited to, the three-pole brushless D.C. motor 100 illustrated in FIG. 1A. The microprocessor 200 includes a plurality of pins BVDD, BH0.0, BH 1.0, BH0.1, BH1.1, BH0.2, BH1.2 B0.0, B0.1, B0.2 and BVSS. A voltage is supplied to the microprocessor 200 via the pins BVDD and BVSS.

The microprocessor 200 also includes a CPU 201, pulse-width modulation logic 202, fast shutdown logic 203 and multi-threshold comparator logic 204. The signal communication between these logic groups of the microprocessor 200 is not shown, in the interest of brevity.

The pulse-width modulation logic 202 includes two pulse-width modulation modules for each motor phase to be driven: EPWM00 and EPWM01, EPWM10 and EPWM11, EPWM20 and EPWM21. Each pulse-width modulation module provides an output signal that may be utilized within the microprocessor. These output signals may be respectively provided via pins BH0.0, BH 1.0, BH0.1, BH1.1, BH0.2 and BH1.2 to control a bridge circuit by which the current flow is regulated by the stator coils.

The fast shutdown logic 203 includes fast shutdown modules FSD0, FSD1, FSD2, for each of the phases A, B, C102, 103, 104, respectively. These fast shutdown modules respectively receive a signal, via a command input (not shown), from the pulse-width modulation modules EPWM00, EPWM01, EPWM10, EPWM11, EPWM20, EPWM21. After receiving this signal or after the end of a programmable delay time for each phase, the fast shutdown modules FSD0, FSD1, FSD2 compare the signal applied at a measurement input with a programmable reference value.

Depending on each comparison, a respective port can be disconnected or an interrupt can be generated. This interrupt starts a fast shutdown service routine, which sets the time that has passed since the last commutation as the delay time between the zero passage of the BEMF and the next commutation time point by programming a hardware timer. After this time has passed, the timer triggers an interrupt. The timer is restarted within the associated timer ISR, the next commutation step is executed, and the multi-threshold comparator (MTC) belonging to the new commutation step is configured for detecting the zero passage of the BEMF.

The multi-threshold comparator logic 204 includes multi-threshold comparator (MTC) modules MTC0, MTC1, MTC2 for each of the phases 102, 103, 104, respectively. These multi-threshold comparator modules each compare an input signal applied from a respective one of the pins B0.0, B0.1 or B0.2 to a programmable reference and, in particular, to the reference value VBAT/2.

The multi-threshold comparator modules MTC0, MTC1, MTC2 provide the comparator function used by the fast shutdown modules FSD0, FSD1, FSD2. In particular, each multi-threshold comparator module provides an output signal that is introduced each time into the respective fast shutdown logic module FSD0, FSD1, FSD2. For further stabilization of the signal, it is possible to filter the input signal with an optional deglitcher (not shown).

Although the present invention has been illustrated and described with respect to several preferred embodiments thereof, various changes, omissions and additions to the form and detail thereof, may be made therein, without departing from the spirit and scope of the invention.

What is claimed is:

1. A method for driving a brushless D.C. motor having a rotor and a plurality of stator windings that define a stator field when driven by a bridge circuit, where a microprocessor drives the bridge circuit using pulse-width modulation logic, the method comprising:
    triggering a commutation of the stator field;
    monitoring voltage induced by rotation of rotor in a non-energized stator winding to determine whether the induced voltage reaches, or is below a threshold voltage;
    determining a delay time between triggering the commutation of the stator field and the voltage reaching, or being below the threshold voltage; and
    using the determined delay time to establish a triggering time point for a next commutation of the stator field;
    where a multi-threshold comparator logic is used for the monitoring of the induced voltage, where the multi-threshold comparator logic is integrated in to the microprocessor, and is synchronized with the pulse-width modulation logic, and where the synchronization is produced via a fast shutdown logic integrated within the microprocessor.

2. The method of claim 1, further comprising generating an interrupt using the fast shutdown logic, where the interrupt initiates an associated fast shutdown service routine that sets a time that has passed since the last commutation as the delay time between a zero passage of a BEMF and a next commutation time point by programming a timer.

3. The method of claim 2, further comprising triggering an interrupt using the timer after the time expires.

4. The method of claim 3, where the interrupt initiates an associated timer interrupt service routine, within which the timer is started again, executes a new commutation step, and the multi-threshold comparator logic associated with the new commutation step is configured for detecting a zero passage of the BEMF.

5. The method of claim 4, where the BEMF voltage is evaluated during the time that the pulse-width modulation is turned on.

6. A microprocessor for driving a brushless multiphase electric motor via a bridge circuit, comprising:
    pulse-width modulation logic that includes a plurality of pulse-width modulation modules for each phase of the motor, each pulse-width modulation module providing an output signal for controlling the bridge circuit;
    shutdown logic that includes a shutdown module for each phase of the motor, each fast shutdown module receiving one of the output signals from the pulse-width modulation modules, and comparing a signal applied at a measurement input to a programmable reference value; and
    a multi-threshold comparator that includes a multi-threshold comparator module for each phase of the motor, each multi-threshold comparator module comparing an input signal to a reference value.

* * * * *